US010482533B2

(12) United States Patent
Leonard et al.

(10) Patent No.: US 10,482,533 B2
(45) Date of Patent: Nov. 19, 2019

(54) METHODS AND APPARATUS FOR SERVICING AN OBLIGATION UTILIZING A BLOCKCHAIN

(71) Applicant: RANIERI SOLUTIONS, LLC, New York, NY (US)

(72) Inventors: Shane Michael Leonard, St. Johns, FL (US); Richard Sheridan Collins, New York, NY (US)

(73) Assignee: Ranieri IP, LLC, New York, NY (US)

( * ) Notice: Subject to any disclaimer, the term of this patent is extended or adjusted under 35 U.S.C. 154(b) by 0 days.

(21) Appl. No.: 16/290,920

(22) Filed: Mar. 3, 2019

(65) Prior Publication Data

US 2019/0272591 A1     Sep. 5, 2019

Related U.S. Application Data

(60) Provisional application No. 62/637,693, filed on Mar. 2, 2018.

(51) Int. Cl.
| | |
|---|---|
| *G06Q 40/02* | (2012.01) |
| *G06Q 20/38* | (2012.01) |
| *H04L 9/06* | (2006.01) |
| *H04L 9/08* | (2006.01) |
| *H04L 9/32* | (2006.01) |
| *G06Q 20/40* | (2012.01) |

(52) U.S. Cl.
CPC ..... *G06Q 40/025* (2013.01); *G06Q 20/38215* (2013.01); *H04L 9/0637* (2013.01); *H04L 9/088* (2013.01); *G06Q 20/401* (2013.01); *G06Q 2220/00* (2013.01); *H04L 9/3239* (2013.01); *H04L 2209/38* (2013.01).

(58) Field of Classification Search
None
See application file for complete search history.

(56) References Cited

U.S. PATENT DOCUMENTS

| | | | |
|---|---|---|---|
| 2017/0011460 A1* | 1/2017 | Molinari | G06Q 40/04 |
| 2017/0046651 A1* | 2/2017 | Lin | G06Q 20/0655 |
| 2017/0046799 A1 | 2/2017 | Chan et al. | |
| 2017/0046806 A1 | 2/2017 | Haldenby et al. | |
| 2017/0232300 A1 | 8/2017 | Tran et al. | |
| 2017/0331810 A1* | 11/2017 | Kurian | H04L 63/083 |
| 2018/0075421 A1* | 3/2018 | Serrano | G06Q 20/105 |

(Continued)

OTHER PUBLICATIONS

Deloitte. Blockchain in commercial real estate is here! Deloitte center for financial services. 2017. (Year: 2017).*

*Primary Examiner* — Kito R Robinson
*Assistant Examiner* — Abdulmajeed Aziz
(74) *Attorney, Agent, or Firm* — Joseph P. Kincart

(57) ABSTRACT

Apparatus and methods for providing transparency, security, and auditability to a loan servicing process by encoding Loan Actions and associated Action data, onto a Blockchain. The Blockchain is distributed to Participants in the Loan, such as the Borrowers, Regulators, Servicers, and Vendors. The present disclosure further provides a method for homogenizing a variety of Vendor Formats for inclusion on the Blockchain and memorializing execution of a smart contract on the Blockchain. simplifying Transactions such as assignment of the rights of a Participant are simplified and memorialized and accessible via a communications network.

9 Claims, 6 Drawing Sheets

(56) References Cited

U.S. PATENT DOCUMENTS

| | | | |
|---|---|---|---|
| 2018/0204213 A1* | 7/2018 | Zappier | H04L 63/08 |
| 2018/0218176 A1* | 8/2018 | Voorhees | H04L 9/3239 |
| 2018/0268504 A1* | 9/2018 | Paolini-Subramanya | H04L 9/3236 |
| 2018/0285970 A1* | 10/2018 | Snow | G06Q 40/025 |
| 2018/0343110 A1* | 11/2018 | Funk | H04L 9/0618 |
| 2019/0057226 A1* | 2/2019 | Arbutina | G06F 21/64 |
| 2019/0123889 A1* | 4/2019 | Schmidt-Karaca | H04L 9/0618 |
| 2019/0130416 A1* | 5/2019 | Boudville | G06Q 30/018 |
| 2019/0220831 A1* | 7/2019 | Rangarajan | G06Q 20/065 |

* cited by examiner

METHODS AND APPARATUS FOR SERVICING AN OBLIGATION UTILIZING A BLOCKCHAIN

RELATED APPLICATION

This application claims benefit and priority to U.S. Provisional Application No. 62/637,693, filed Mar. 2, 2018, entitled "METHODS FOR SERVICING A LOAN UTILIZING A BLOCKCHAIN" which is incorporated herein in its entirety.

FIELD OF THE DISCLOSURE

The present disclosure relates to methods for transparentizing an obligation arising from a dedication of an asset by a first person to the benefit of a second person. Specifically, embodiments, include methods and apparatus to track fulfillment of actions relating to an obligation related to loan servicing with the loan involving the dedication of an asset by a first person to the benefit of a second person.

BACKGROUND OF THE DISCLOSURE

Presently, loan servicing is a highly decentralized industry, featuring a labyrinth of heterogeneous standards and data formats across a wide variety of Participants including Borrowers, Servicers, Investors, Vendors, and other persons involved in a loan servicing process.

As a result, even a small change in a status of a given Loan, or an event relating to the Loan, may take a significant amount of time to trickle down to every participant involved in the Loan and the veracity of information is sometimes less than certain. This may result in various Participants to the Loan taking inconsistent actions based on outdated data. Moreover, Servicers and Investors lose a substantial amount of money each year due to missing loan documentation and regulatory penalties.

The systems used by many loan servicers are fragile and rigid using highly outdated mainframe programming languages, many of which were first devised decades ago.

Additionally, Participant wishing to view a status of a Loan, or to understand reasons behind certain events pertaining to the Loan, presently need to be authenticated by a relevant loan service provider and retrieve data from a variety of different locations.

In addition, the loan servicing industry is a highly regulated one. Each Participant to a Loan is custodian of at least some potentially sensitive data that may be legally protected from disclosure or inadequate data protection. Moreover, not all Participants are permitted to view all data for the Loan. For example, while a Borrower should generally be able to see every document pertaining to her Loan, a Vendor providing an appraisal should not necessarily have access to every recorded phone call between the Borrower and a Servicer.

Additionally, known loan servicing systems necessarily entail asymmetrical levels of trust. Some Participants may have financial incentives to modify certain documents (or may accidentally do so). Previous systems provide little or no deterrence to document modification.

SUMMARY OF THE DISCLOSURE

Accordingly, the present invention provides methods and apparatus for ensuring transparency in an obligation servicing process, such as, for example a loan servicing process.

The methods and apparatus provide for regulating access to loan documents, providing safeguards against subsequent intentional or accidental document modification, tracking access to documents, and uniquely centralizing an inherently decentralized process.

The present invention utilizes blockchain technology to provide Participants to a given Loan with an up-to-date certified correlation of actions executed, recordation of an identity of who executed respective actions, and certifying data, such as a ledger of actions taken on a Loan, as well as data associated with each action (e.g., time, place, user), thus ensuring that Participants: (a) can access only specific loan documents to a particular Participant is permitted; (b) cannot modify a previous action; and (c) can easily append an new Loan Action a blockchain and link that new Loan Action to previous events (e.g., a request for a new loan).

Additionally, in some embodiments of the present invention, a Portal is configured to accommodate varying data formats of disparate Participants and Vendors. Presently, varying formats care responsible for considerable delay, inaccuracy, and difficulty in obligation tracking, such as loan servicing process. In some embodiments, the Portal is configured to accept data in Vendor Format and write the data to a Blockchain pertaining to a Loan or other Obligation in the same Vendor Format as the data was received. In other embodiments, a Vendor translates data from a Vendor Format to a standardized Servicer Format, which the Portal accepts and writes to the Loan Blockchain. In still other embodiments, a Vendor is one of multiple known Participants. Each Participant may utilize a respective known (if still heterogeneous) data format. The Portal is operational to convert data from a Vendor Format to a Servicer Format, and store the data in the Servicer Format on an associated Loan Blockchain. In some embodiments of the latter embodiment, the Portal may translate data retrieved from a Loan Blockchain in a Servicer Format to a requested Vendor Format. Data retrieved from a Loan Blockchain may be transmitted to a Participant in one or both of the Servicer Format and the Vendor Format.

In still other embodiments, multiple Blockchains may support an obligation or loan, such as a Vendor specific blockchain or a function specific Blockchain (e.g. payment transaction Blockchain or loan owner Blockchain). A master blockchain may track entries into other Blockchains included in a hierarchical or relational group of Blockchains.

In still another aspect, an artifact and/or acknowledgement of the generation of an artifact may be included in a Blockchain. An Artifact may include one or more of: a Smart Contract; an online submission with electronic signature verification; or other quantifiable execution of an action may be stored in electronic format.

In some embodiments, the present invention may be practiced as a method for servicing a mortgage loan utilizing a Blockchain. An obligation may be established based upon a transfer of an asset from a first party to a second party and the obligation may be secured with a collateral asset. A Blockchain is initialized on a computer server that is accessible via a digital communications network. The Blockchain may include multiple time sequential blocks, with each block storing information related to the obligation.

The obligation may be memorialized in the Blockchain as a mortgage loan agreement. A first additional block may be added to the Blockchain, with the first additional block including a memorialization of the mortgage loan agreement. The Blockchain may be transmitted to a Loan Participant via the communication network.

The Blockchain may be configured to include Action data associated with a Loan Action in a Block in the Blockchain and appending the Action data to an end of the Blockchain as a second additional block. An access right established specifying which portions of the first additional block and the second additional block a Loan Participant may access and how.

The communications network may be used to transmit the Blockchain to the Loan Participant. The Blockchain may include the block storing information that memorializes the obligation, the first additional block that memorializes the mortgage loan agreement, and the second additional block. Access may be granted to the first additional block and the second additional block on the block chain. The access may be granted based upon the established access rights to the first additional block and the second additional block.

In another aspect, notification of a payment related to the obligation may be memorialized in the mortgage loan agreement and the notification of the payment may be stored in a third additional block on the Blockchain. An access right for the Loan Participant may be established to the third additional block. Access rights typically include one or more of the abilities for the Loan Participant to know the Block exists but not be able to access information included in the Block, the ability to write to the Block and the ability to read the Block.

In some embodiments, an artifact may be received quantifying an inspection of the collateral asset. The artifact may be stored in a fourth additional block and an access right established for the Loan Participant to the fourth additional block. An artifact may, for example, include an appraisal of the collateral asset and be stored in a fifth additional block with access rights established for the Loan Participant to the fifth additional block.

In another aspect, a quantification of a correspondence regarding the mortgage loan agreement may be received and stored in a sixth additional block with an access right established for the Loan Participant to the sixth additional block. Action data may for example include one or more of: an identity of a person executing the Loan Action and a resulting Loan balance following the Loan Action. In some embodiments, a previous block of the Blockchain relating to the Loan Action may be cross referenced and a date for a follow-up action stored in the Blockchain. The Loan Action may be prompted by a Loan Servicing File that includes a record of at least one of: a work order, an email, correspondence and conversation recordation. A Loan Servicing File may be a Hardcopy File, and the Action data further include information related to a physical location of the Hardcopy File. Action data may further include accessing information to retrieve an electronic facsimile of the Hardcopy File via the communications network. IN addition, the Blockchain may include an electronic facsimile of a hardcopy Loan Servicing File.

In another aspect, a server may be configured as a Portal in logical connection with the communications network. The Portal may include a memory, a processor, and a software executable on demand. The Portal may have full read access and write access to the Blockchain as a Participant. In addition, the Portal may receive new Action data from a Vendor Participant via the communications network; and create a new additional block on the Blockchain including the new Action data.

In some embodiments, a transmission to the Portal may adhere to a transmission format based upon a Vendor Format pertaining to a specific Vendor, and information may be stored in the Blockchain in the Vendor Format.

In additional embodiments, a transmission format may be a Servicer Format, which is agreed upon by at least one Participant as a standardized format, and the recorded format may be the Servicer Format.

In still other embodiments, a transmission format may be a proprietary Vendor Format pertaining to a specific Vendor, and the recorded format may be the Servicer Format, which is agreed upon by at least one Participant as a standardized format, and the Portal may be further configured to transform the Vendor Format to the Servicer Format by way of a pre-programmed template.

In another aspect, upon request by a Participant with read access to a Blockchain, data stored in the Blockchain may be translated from a Servicer Format to a Vendor Format.

Some additional embodiments may additionally include the step of executing a smart contract and storing the smart contract on the Blockchain. The Blockchain may be accessed via a network access device, such as a PC or a mobile smart device. In some embodiments, information stored on the Blockchain may be transmitted from a uniquely identified smart device.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

Figure 1:
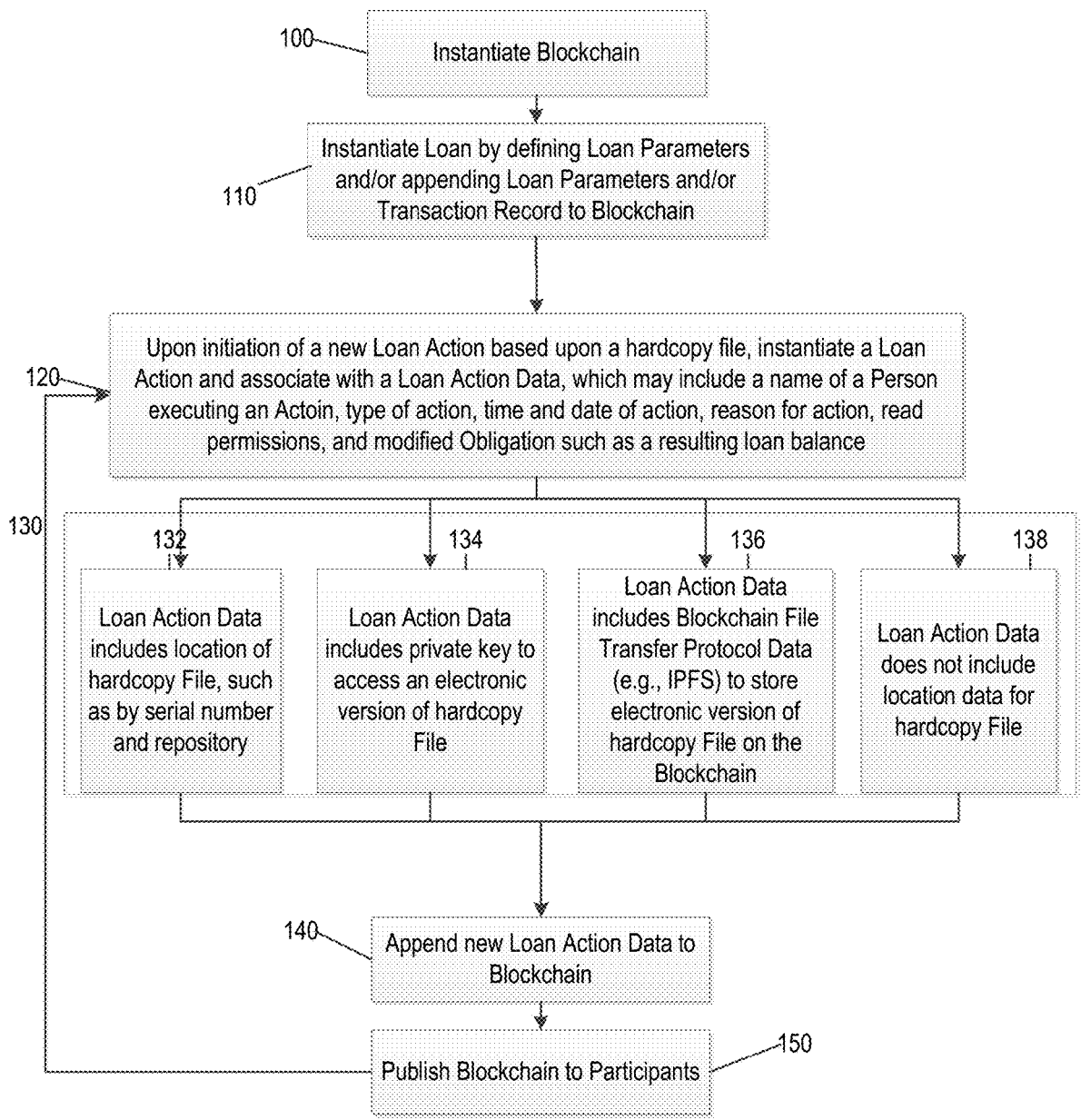
FIG. 1 illustrates an exemplary flowchart of the addition of a new Loan Action and associated new Action data to a Blockchain.

The present disclosure provides generally for methods and apparatus for instilling transparency, security, and auditability in a loan servicing process or other series of actions based upon an Obligation. According to the present disclosure, a Participant to a given Loan operates a computerized node to access a Blockchain corresponding to actions executed that relate to the Loan. When a Participant initiates a new Loan Action based on an event, such as receipt of a work order, the Participant creates a new block on one or more associated Blockchain, encodes associated new Action data on the new block, and transmits an updated Blockchain to Participants. A Participant may include a Person accessible via an automated network access device or an automaton, such as an Artificial Intelligence ("AI") bot or the like.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

Although presented and described in view of pecuniary lending of a currency amount, the present method may be applied to a broad field of dedication of one or more assets by a first party to the benefit of a second party.

Glossary

"Action" as used herein, refers to an executed method step that is part of, or the entirety of a process.

"Artifact" as used herein refers to an item containing information or representative of information. An artifact may include one or more of: a document, an electronic communication, a voice recording, a video clip and a picture or other image data.

"Asset" as used herein, refers to an item with an associated value, wherein ownership or use of the item may be transferred from a first Person to a second Person.

"Blockchain," as used herein, refers to an implementation of an append-only, computerized linked data record (a "Block") known to those in the art as a blockchain, which is transmitted to, and stored upon a plurality of computerized nodes operated by a plurality of Participants upon an appending action. As used herein, Blocks on the Blockchain are generally numbered as $B_n$, where n is an integer. Where n is not assigned a specific integer, $B_n$ is presumed to be an arbitrary block on the Blockchain; if n is a specific integer, then $B_n$ is presumed to be a corresponding block (e.g., $B_1$ is the first block on the Blockchain). Unless otherwise indicated, $B_n$ occurs sequentially before $B_{n+1}$. Where $B_n$ and $B_m$ are described separately, m is presumed to be an integer not equal to m. A block may be time stamped and secured and bound to each other using cryptographic principles (i.e. chain).

"Collateral" as used herein refers to an asset, property or other item of value used to guarantee execution of an Action.

"Electronic File," as used herein, means any Loan Document captured in a digital format. By way of non-limiting example, an Electronic File may include one or more of: images, recording of phone calls, and electronically recorded data.

"Loan," as used herein, refers to provision of one or more assets by a first party for the benefit of a second party for use by the second party. A Loan may be memorialized in a contract between the first party and the second party. Preferably the contract is quantified in a written document (electronic or hardcopy) and includes party identifiers, terms and conditions of the contract, and methods of meeting an obligation (such as, for example, making a payment). By way of non-limiting example, a Loan may be one or more of: credit card, mortgage, student loans, or commercial leasing and lending.

"Loan Document," as used herein, means a text or image data quantified within boundaries and related to a Loan.

"Loan Servicing File," as used herein, means one or both of a hardcopy file and an electronic file containing one or more of: information, records of completed or anticipated Actions, artifacts and documents related to a Loan.

"Obligation" as used herein refers to an agreed upon action or series of actions to be taken by or on behalf of an Obligor.

"Obligor" as used herein refers to a Person bound to perform an Action or series of Actions.

"Hardcopy File," as used herein, refers to any hard copy medium embodying a transaction or other action related to a Loan. By way of non-limiting example, a Hardcopy File may be one of: work order, promissory note, or documentation.

"Participants," as used herein, refers to Borrowers, Investors, Vendors, and Servicers that are parties to a Loan.

"Person" as used herein refers to a legal entity capable of ownership of an asset and/or being bound to execute an Action.

"Portal," as used herein, refers to a computerized server in logical connection with a network access device and with software executable on demand, which is configured to accept New Loan Data from a Vendor and, in some embodiments, transmit desired blocks from the Blockchain to a Vendor.

"Servicer" as used herein refers to a Person tracking and facilitating fulfillment of Obligations by an Obligor. A Loan Servicer tracks fulfillment of Obligations related to a Loan type Obligation.

Referring now to FIG. 1, a list of exemplary method steps that may be executed in practicing some embodiments of the present invention are illustrated. At 100, a Blockchain is instantiated. At 110, first block $B_1$ is instantiated. $B_1$ includes the Loan Parameters. By way of non-limiting examples, Loan Parameters may include a description of an Asset included in the Loan (an asset may include, for example, a pecuniary amount); terms for returning the assets, e.g., a schedule of payments and ultimate deadline to pay back pecuniary amounts involved in Loan; amortization tables; names of parties to the loan; Collateral for the Loan, and information relating to the Collateral, such as an appraisal amount.

Blocks 120-140 illustrate steps involved in the processing of a new Loan Action. A Loan Action may include, but is not limited to, payments on the loan; phone calls between the Borrower and a Loan Servicer; audits on the loan; actions necessary to protect the collateral of the loan (e.g., property appraisals); foreclosures; additional services offered based upon one or both of: The Loan and Collateral; and a default on a Loan payment or other obligation.

At 120, the new Loan Action is instantiated based upon or relating to an Obligation Servicing File, such as a Loan Servicing File. An Obligation Servicing File may store a wide range of action initialization media. The media may include, but is not limited to, a promissory note; a letter requesting some action be taken on the loan; supporting documentation such as an appraisal of Collateral and an audio recording of a phone call or other conversation. A Loan Servicing File may be a Hardcopy File or an Electronic File. If a Loan Servicing File is a Hardcopy File, then the Hardcopy File might be digitized, leading to the creation of an Electronic File based on the Hardcopy File. If (n−1) block-creating actions have occurred on the Blockchain, then the instantiation of the new Loan Action results in the creation of a new block, $B_n$.

A new Loan Action may be associated with new Action data, which may include (but is not limited to) the name of a Person requesting and/or performing the new Loan Action; a type of Action; a time and date of the request; a time and date of requested performance; a deadline for complying with a request; in the case of a communication session, such as a phone call, video conference, a live interaction, a duration of the communication session; a reason for executing a Loan Action; a change to a pending Obligation, such as a loan balance, as a result of the Loan Action; a read permission for $B_n$; and in the case of an Action taken in response to a request documented at block $B_m$, a cross-reference linking $B_n$ to $B_m$.

In some embodiments a link is established in a platform of apparatus supporting a related Blockchain that links a related Loan Servicing File with $B_n$ by adding to Action data information related to the Loan Servicing File. This may be particularly useful in situations with a Loan Action based upon content included in a Loan Servicing File. For example, possible, non-exhaustive options for generating a link may include one or more of: Action data includes location of a hardcopy file 132; Action Data includes a private key to access all or part of a file 134; Action Data includes Blockchain file transfer protocol data (PFS) to store an electronic version correlating with a hardcopy file on the Blockchain 136; Action Data does not include a location of a hardcopy file; Action Data is appended to a Blockchain 140 and a Blockchain is published back to Participants 150.

Further, FIG. 1 is a non-limiting example illustrating a Loan Servicing File that is, at least initially, a Hardcopy File. At 132, new Action data includes a physical location of a Hardcopy File, such as by one or more of: serial number; file custodian identification; and repository. Association of a hardcopy file with a Blockchain based electronic system may be used to serve as an intermediate step for a loan servicer executing Action steps to modernize loan servicing database, and still keep some amount of information at a hardcopy data warehouse. By way of non-limiting example, a user opting to implement a method using step 132 includes on $B_n$ that a promissory note underlying a loan is located in Warehouse 4, Room 120, File Cabinet 3. By way of another non-limiting example, if $B_n$ stores Action data regarding a phone call with a borrower, $B_n$ may indicate identification information and a file path for a computer server on which one or both of an audio recording and transcription of a phone call is stored. As discussed more fully below, a computer server includes a processor in logical communication with a storage medium storing executable code that is executable on command to cause the processor to execute method steps.

Block 134 illustrates another possibility for linking a hardcopy artifact, document or file with Action data, by way of an electronic file. At 134, the electronic file is uploaded to secure data storage via a communications network, such as the Internet. Due to a potentially sensitive nature of an electronic file (e.g. a file with content relating to personally identifiable financial documents), the Electronic File may be encrypted. For example, encryption may be implemented via Rivest-Shamir-Adleman ("RSA") cryptosystem for secure data transmission or another cryptography method for data transmission and/or storage. RSA cryptography is an asymmetric encryption scheme, comprising the use of a private and public key.

In some embodiments of the present invention, Participants receive a public key to allow encryption of information included in an Electronic File stored on a Blockchain. However, in some embodiments, at 134, only those Participants authorized to view an Electronic File receive an affiliated private decryption key. Accordingly, a Participant authorized to view $B_n$ is provided with a mechanism to access to the Electronic File. Similarly, 136 allows a Participant authorized to view $B_n$ to view the Electronic File directly on a Blockchain, if the particular Blockchain implementation utilized allows for file storage. Blocks 134 and 136 could also cover a Loan Action prompted by a Loan Servicing File that originates as an Electronic File. In some embodiments, an electronic file stored $B_n$ may not be associated with a hardcopy file 138.

Entry of new Action data, including reference to the Loan Servicing File described by 130, may be aggregated and associated Action data is added to block $B_n$, which is appended 140 to the Blockchain.

In addition, the Blockchain may be published 150 to all Participants or to selected Participants. Publication is an important element of Blockchain technology, as it allows for the nonrepudiation of a given block. In some embodiments, a Participant may possess a current copy of a Blockchain and yet the Participant may not have read access to one or more blocks included in the Blockchain.

Figure 2:
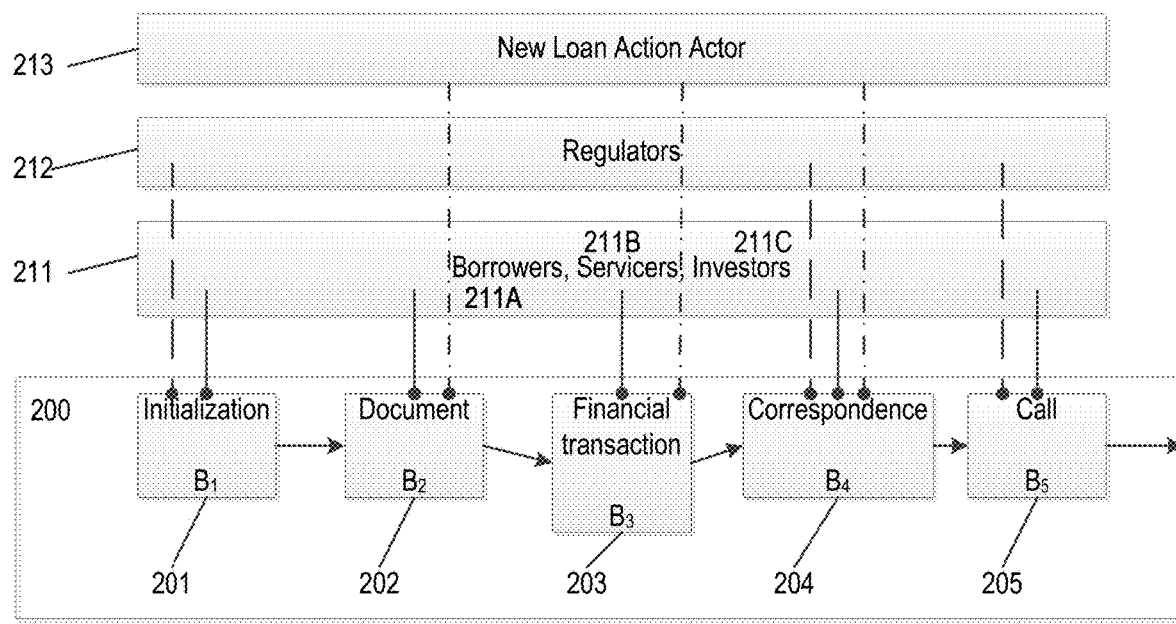
FIG. 2 illustrates an exemplary Blockchain with read access permissions defined.

Referring not to FIG. 2, an exemplary section of a Blockchain 200 is illustrated, including a Block's read permissions for a variety of examples of Participants. In this non-limiting example, the Blockchain illustrated includes five Blocks, 201-205. Pertinent classes of Participants in this example include Borrowers; Servicers; Investors 211; Regulators 212; and an Action Actor 213 executing an Action. $B_1$ 201 corresponds to an initialization of the loan. Data stored on $B_1$ may include an electronic copy of the promissory note; the original balance of the loan; the payment term; and the collateral for the loan. The lines ending in dots demonstrate read access. For example, it may not be desirable to give every Participant one or both of read and read and write access to every Block. For example, a new Loan Action Actor 213, may not be provided read access to data in a Block that includes a promissory note and other sensitive information stored on $B_1$ 201. On the other hand, one or more Regulators 212 may be properly vetted and be provided audit authority to all Blocks based upon the Regulators' 212 interest in sensitive information. Additionally, one of the primary goals of the present disclosure is increasing transparency for one or more Participants, such as: Borrowers 211A, Servicers 211B, and Investors 211C. Accordingly, as demonstrated by FIG. 2, only Regulators 212 and Borrowers 211A, Servicers 211B, and Investors 211C may be provided access to $B_1$ 201.

A document $B_2$ 202 or other artifact, may in this example, correspond to a Loan Servicing File initiating a request on behalf of a new Loan Action actor, which has access to view the document $B_2$ 202 it added to the Blockchain 200. A financial transaction $B_3$ 203, may in some examples, be linked to document 202 at $B_2$. Correspondence $B_4$ 204 may also be stored in a Block $B_4$. Correspondence may include hardcopy, electronic communication, facsimile, or other artifact conveying information from a first Person to a second Person. Similarly, a record of a Call $B_5$ 205 is exemplary of another type of Blocks which may exist within the Blockchain 200 memorializing Actions arising from an Obligation, such as a loan. According to the present invention, a record of a call may include one or more of an audio file, a transcript of a conversation, a video file, or other record of an: in person, telephonic or voice/video over IP (VOIP) conversation.

Records of other information and artifacts may also be stored in a Block, such as, by way of nonlimiting example: scanned documents; e-signed documents; spreadsheets; receipts of payment; documents validating an identity; notary seal; appraisals; photographs; comparable property descriptions; proof of funds; evidence of income; biometric measurements, declarations of race and/or ethnicity, evidence of residency, evidence of citizenship; parties of interest; co-signers; guarantors; next of kin; insurance policies and/or summaries; and other information that may be memorialized or quantified in an electronic format and stored in a Block.

Figure 3:
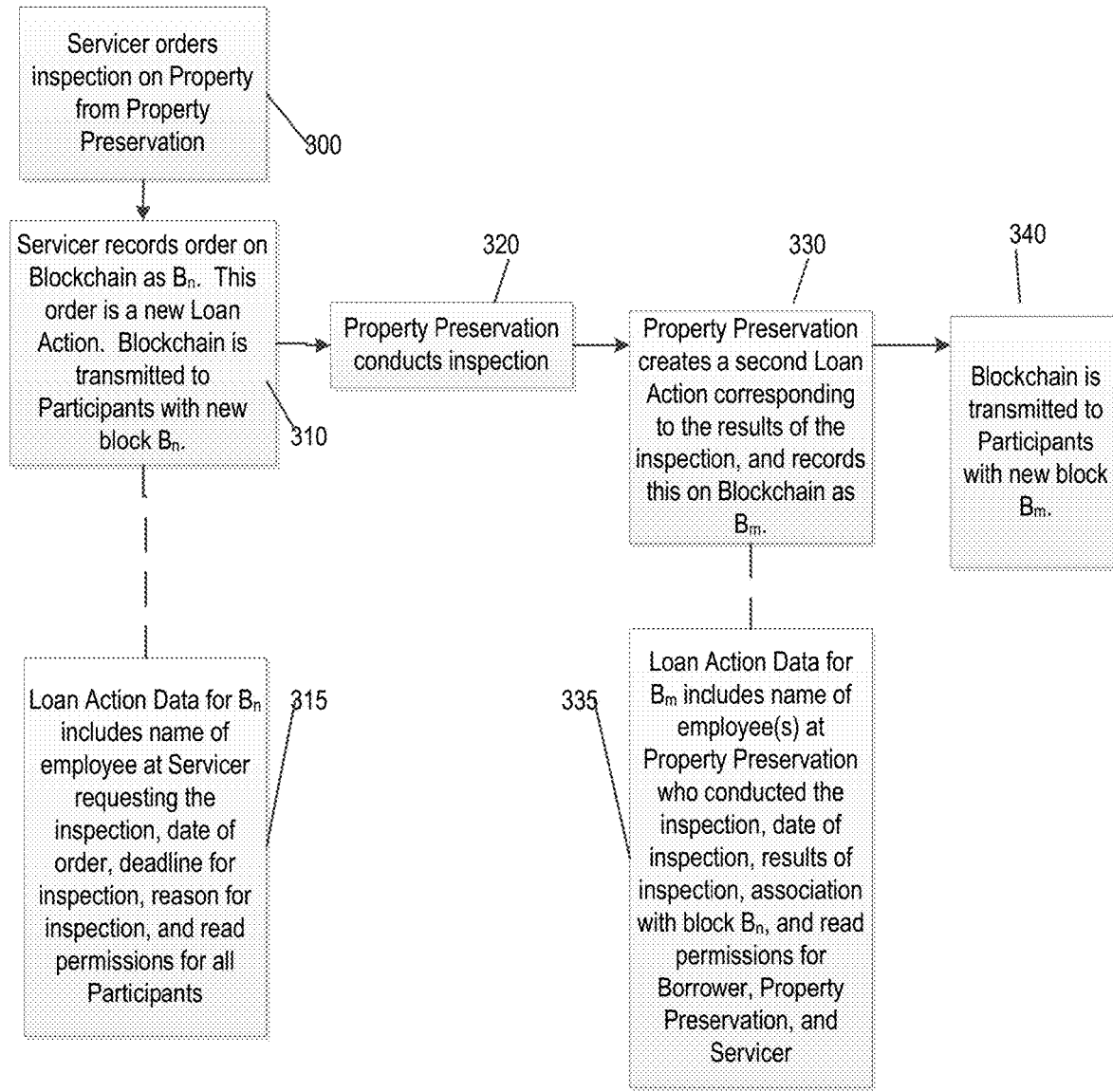
FIG. 3 illustrates a mortgage-specific, non-limiting example of the interaction of two Participants with a Blockchain.

Referring now to FIG. 3, exemplary method steps are illustrated that may be executed in some embodiments of the present invention. The example illustrated generally relate to a pair of linked transactions related to a mortgage. At 300, the mortgage Servicer, which is a Participant, orders an inspection on Borrower's Property from another Participant, Property Preservation.

At 310, as part of the process of ordering the inspection, Servicer records the inspection order on Blockchain as block $B_n$. The order constitutes an Action to commence a new Loan. The Action is associated with Action data 315. In this non-limiting example, the Action data 315 recorded on block $B_n$ includes the name of the employee at Servicer requesting the inspection; data of the order; deadline for inspection; reason for inspection; and instructions allowing all Participants to read $B_n$. Once the new Loan Action and new Action data are recorded on new block $B_n$, the Blockchain 100 is transmitted to Participants. In some embodiments, Property Preservation records a confirmation of receipt on new block $B_{n+1}$, or another block linked to $B_n$.

At 320, Property Preservation Vendor conducts the ordered inspection. Upon completion of the inspection, at 330, Property Preservation instantiates a new Loan Action on block $B_m$ (where m>n). This new Loan Action will have associated with a new Action data 335, pertinent information related to the inspection. This new Action data 335 recorded on block $B_m$ includes the name of the employee(s) at Property Preservation who conducted the inspection and reviewed its results; the results of the inspection; association with block $B_n$; and read permissions for Borrower, Property Preservation, and Servicer.

Finally, the updated Blockchain is transmitted 340 to Participants with new block $B_m$. Notably, even those Participants who do not have read access will receive the updated Blockchain. Such Participants will (a) be aware that the Blockchain has been updated with new block $B_m$; and (b) be able to see the hash value, previous block hash value, and nonce of $B_m$. This is necessary to achieve the nonrepudiation trait of Blockchain.

In some embodiments, it may be desirable to encode on the block $B_m$ data that all Participants can access. In the non-limiting example shown in FIG. 3, all Participants have read access to $B_n$, which stores the inspection order, but only a limited subset of Participants have read access to $B_m$, which stores the results of the inspection. Although such results may be confidential, it may nonetheless be desirable for a Participant that can read $B_n$ to be aware that $B_m$ contains the result of the inspection order stored at $B_m$. Accordingly, the new Action data for $B_m$ can also specify the read access of each element of new Action data for $B_m$, and may allow read access to all Participants for the datum linking $B_m$ to $B_n$.

Again, the implementation set forth in FIG. 3 is merely a non-limiting example. In a generic situation, Property Preservation could stand for any Vendor or other provider assisting the loan Servicer, and the inspection could be any action taken in furtherance of the Loan.

Currently, one of the largest problems facing the loan servicing industry is the myriad format types used by Vendors and Servicers in processing information. Many Vendors have their own proprietary data formats, which may render adding data 330 to the Blockchain 100 difficult or nearly useless.

Figure 4:
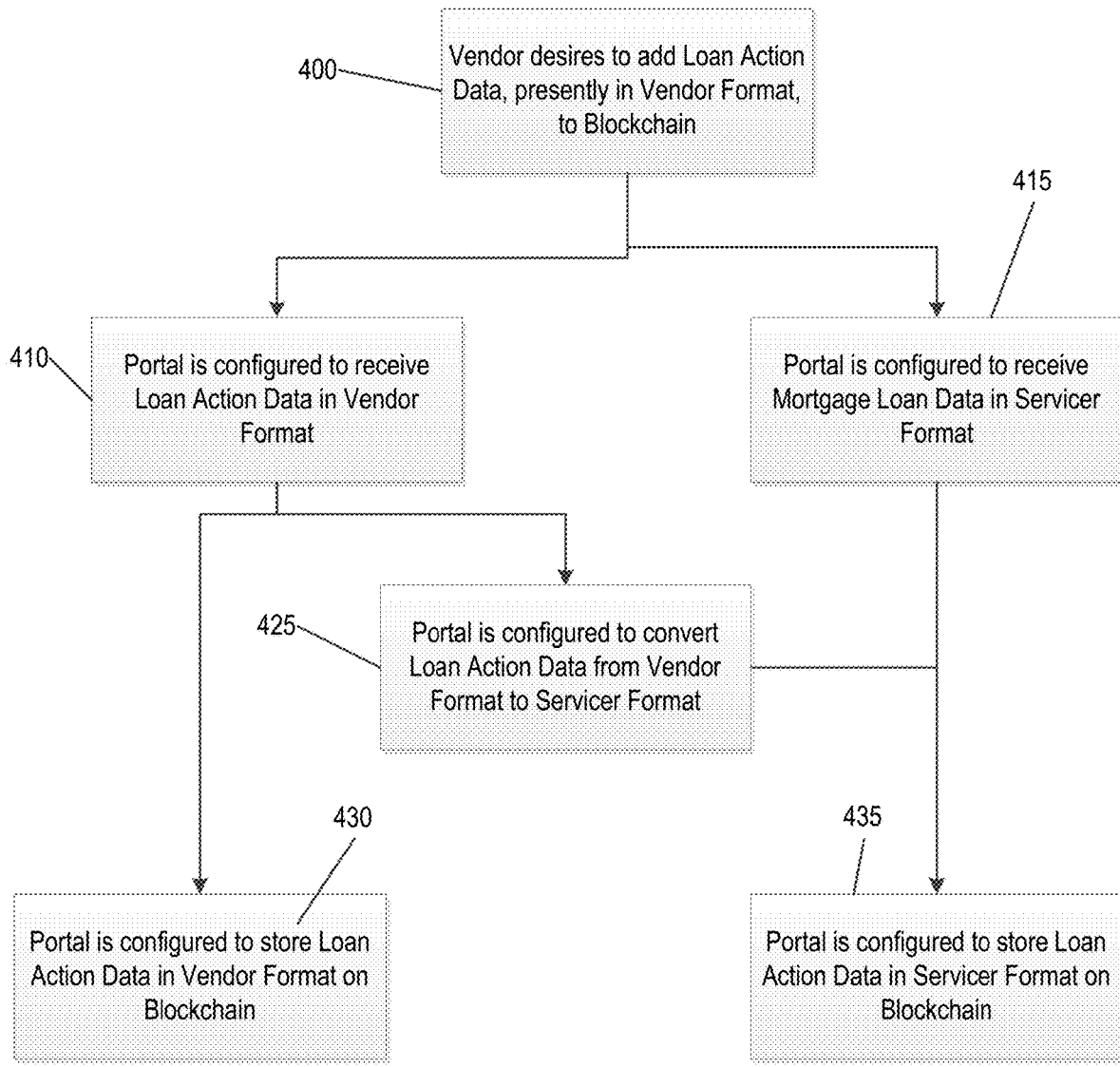
FIG. 4 illustrates three exemplary embodiments of a Portal.

Accordingly, referring now to FIG. 4, in some embodiments it may be desirable to configure a Portal to assist in converting data to and from the proprietary formats of the various Participants (the "Vendor Format"). The Vendor Format is in contrast to a standardized format utilized by the Servicer, the Servicer Format. While this non-limiting example assumes that Servicer Format is ordinarily more desirable than Vendor Format, this is not required. At 400, a Vendor (such as, in FIG. 3, Property Preservation) desires to add new Action data to the Blockchain. The Portal may be configured in one of at least three alternative ways.

410 and 430 demonstrate Alternative A: at 410, the Vendor simply uploads to the Portal new Action data in Vendor Format. At 430, Portal instantiates a new block on the Blockchain with the new Action data stored in Vendor Format. This Alternative may be desirable where a plurality of Vendors associated with the Loan, possibly along with Investors, Borrowers, and Servicers, use a same or similar data format to the Vendor Format. Alternative A may also be desirable if Vendor uses any proprietary encryption techniques and wants decryption to occur outside the Blockchain environment. In Alternative A, the work in converting the new Action data to Servicer Format for use by Servicer is done by Servicer.

415 and 435 demonstrate Alternative B: at 415, Vendor converts the new Action data in Vendor Format to a format readable by Portal, Servicer Format. Vendor uploads to the Portal the Action data in Servicer Format, and at 435, the Portal instantiates a new block on the Blockchain with the Action data stored in Servicer Format. In Alternative B, the work in converting the Action data to Servicer Format is done by Vendor.

410, 425, and 435 demonstrate Alternative C: at 410, the Vendor simply uploads to the Portal Action data in Vendor Format. At 425, the Portal converts the data from Vendor Format to Servicer Format, and at 435, the Portal instantiates a new block on the Blockchain with the new Action data stored in Servicer Format. In Alternative C, the work in converting the new Action data to Servicer Format is done by the Portal. Accordingly, Alternative C is most desirable where a given Loan is associated with limited, known Vendors whose respective Vendor Formats may be preprogrammed into the Portal, allowing for ready conversion between the respective Vendor Formats and the Servicer Format. This allows each Participant to retain its respective proprietary format, while also providing a universal format (the Servicer Format) for participants like Borrowers or Investors who may not have proprietary formats.

A significant advantage of the present invention is that it reconciles a present state of the loan servicing industry, which is simultaneously centralized and decentralized. While there is a central entity responsible for handling the day-to-day servicing of a Loan (described herein as the Servicer), the Servicer outsource a variety of tasks to Vendors. Borrowers and Investors may have their own respective interests in a Loan. However, during the lifetime of a given Loan, each of multiple Participants may change identities multiple times. For example, a Servicer that created $B_1$ of the Blockchain may assign Servicer's rights and obligations under an underlying contract to a different Servicer. In some embodiments, the present invention provides a standardization of loan servicing process on a Blockchain, with a smart contract protocol incorporated onto the Blockchain to facilitate contracts and/or other documents underlying an associated Loan process. A smart contract will include a self-executing contract with terms of agreement directly written in computer code. In some embodiments, a smart contract may be executed without a physical hardcopy.

Figure 5:
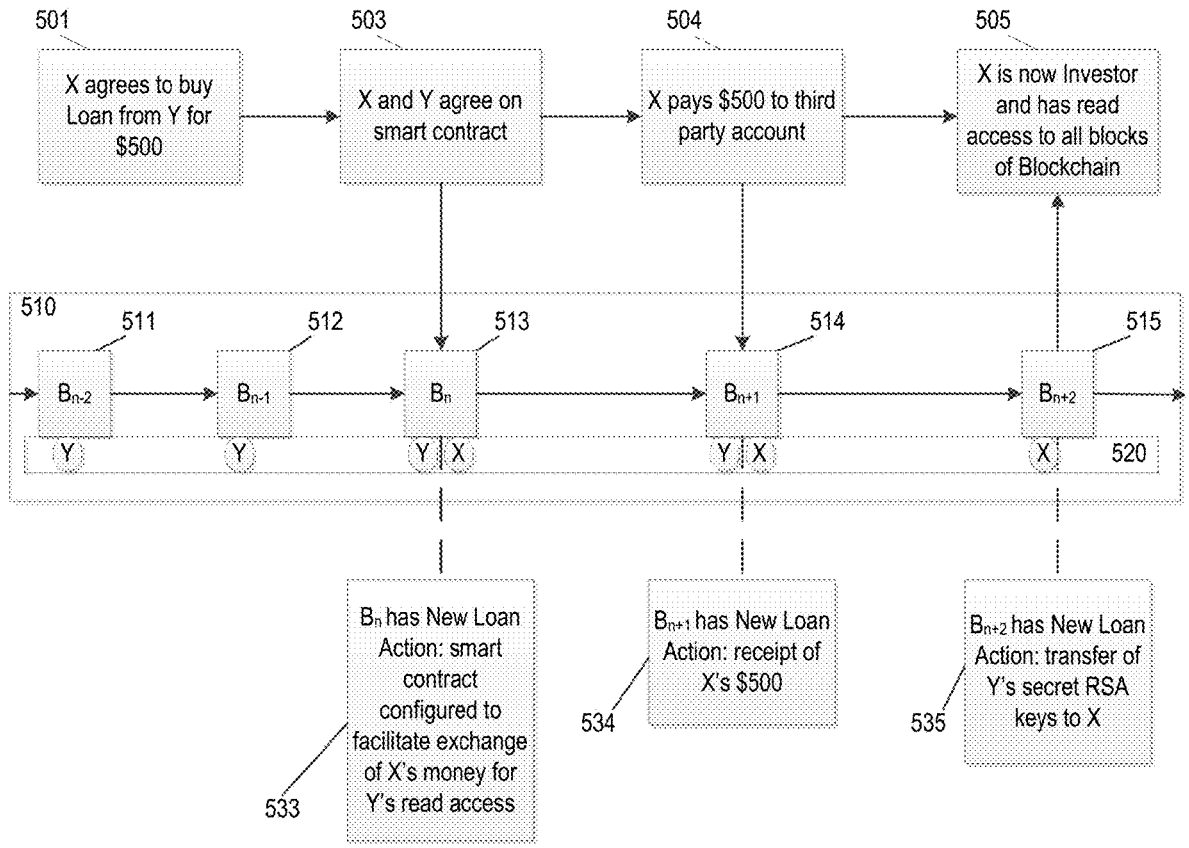
FIG. 5 illustrates an exemplary smart contract transfer of Investor status between a Company X and Company Y.

Referring now to FIG. 5 some embodiments of the present invention are illustrated that include a smart contract protocol applied to the Blockchain. FIG. 5 demonstrates a non-limiting example of a smart contract for transferring an Investor role from a Company Y to a Company X. One pertinent portion of the Loan Blockchain is shown at 510, with read access for each block demonstrated at 520. Note that 520 only shows presence or absence of read access for X and Y; other Participants such as Borrower may have read access to these blocks. Thus, Y is the Servicer and has read access to blocks $B_{n-2}$, at 511 and $B_{n-1}$ at 512, prior to any agreement to transfer the Servicer role.

At 501, X agrees to buy the underlying Loan from Y for $500. Since the underling Loan is implemented using the present method on Blockchain 510, at 503 X and Y agree to implement the transfer on a smart contract. This smart contract constitutes a new Loan Action, and accordingly is recorded at 513, $B_n$. X now becomes a Participant, and both X and Y have read access to $B_n$.

The smart contract at $B_n$ has new Action data corresponding to 533. In particular, in this non-limiting example, the smart contract is a program configured to (a) store Y's Investor access credentials (e.g., Y's secret key in an RSA cryptography scheme); (b) receive in a third party account the $500 from X; (c) upon receipt of $500 from X, transfer Y's Servicer access credentials to X; and (d) transfer the $500 from the third party account to an account designated by X for receipt of the $500.

At 504, X pays $500 to a third party account. This event is recorded as a new Loan Action at 514 block $B_{n+1}$. This new Loan Action at 514 block $B_{n+1}$ may include an acknowledgement 534 of a receipt of X's $500. Both X and Y may be provided read access to $B_{n+1}$.

Finally, the smart contract program itself executes and creates block 515 $B_{n+2}$. The associated new Loan Action 535 records and executes the transfer of Y's access credentials to X at 505. X now has read access to at least all blocks beginning with $B_n$. In some embodiments, it may be desirable upon completion of this transfer to give X read access to all blocks preceding $B_n$, and/or revoke Y's access credentials to the entire Blockchain. This method of assignment is highly desirable, as it provides an easy method to transfer data about the Loan to X, instead of the present environment, which involves hours of digging through data warehouses.

Figure 6:
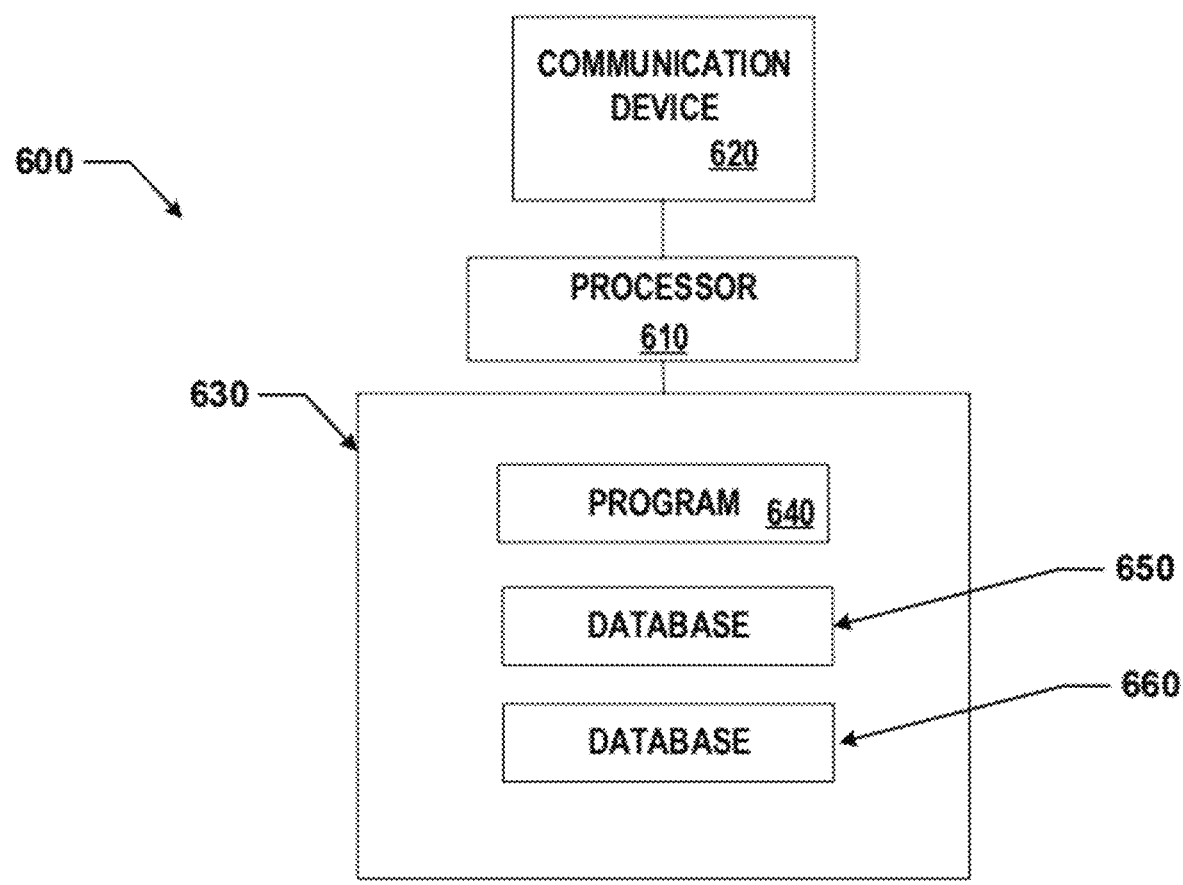
FIG. 6 illustrates apparatus that may be used to implement aspects of the present disclosure including executable software.

Referring now to FIG. 6 a controller 600 is illustrated that may be utilized to implement some embodiments of the present invention. The controller may be included in one or more of the apparatus described above, such as the Blockchain Server, and the Network Access Device. The controller 600 includes a processor unit 610, such as one or more semiconductor based processors, coupled to a communication device 620 configured to communicate via a communication network (not shown in FIG. 6). The communication device 620 may be used to communicate, for example, with one or more online devices, such as a personal computer, laptop, or a handheld device.

The processor 610 is also in communication with a storage device 630. The storage device 630 may comprise any appropriate information storage device, including combinations of storage devices (e.g., hard disk drives and server farms), solid state drives, optical storage devices, and/or semiconductor memory devices such as Random Access Memory (RAM) devices and Read Only Memory (ROM) devices.

The storage device 630 can store a software program 640 (executable software code executable on demand) for controlling the processor 610. The processor 610 performs instructions of the software program 640, and thereby operates in accordance with the present invention. The processor 610 may also cause the communication device 620 to transmit information, including, in some instances, control commands to operate apparatus to implement the processes described above. The storage device 630 can additionally store related data in a database 650 and database 660, as needed.

In various embodiments, a controller 600 may be incorporated into a network access device such as a smart device (e.g. a smart phone or smart tablet); a personal computer (PC), a network server, or specialized user interactive device. Controllers may also be incorporated into specialized equipment, such as a scanner or printer. Typically, the scanner or printer will be in logical communication with a distributed network, such as a wide area network (WAN), a virtual private network (VPN) and/or the Internet. A Blockchain will be stored on a server (Blockchain Server) including one or more processors operative via executable software to perform the method steps described herein. Typically, the Blockchain Server will be accessible via a communications network via network access device with a controller executing executable software.

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" be used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

In certain implementations, multitasking and parallel processing may be advantageous. Nevertheless, it will be understood that various modifications may be made without departing from the spirit and scope of the claimed disclosure.

What is claimed is:

1. A method for servicing a mortgage loan utilizing a blockchain representative of an electronic loan servicing file and hardcopy authentication, the method comprising:

a participant establishing an obligation based upon a transfer of an asset, said participant comprising a borrower, investor, vendor or servicer to a loan;

the participant securing the obligation with a collateral asset;

generating a first additional block on the blockchain memorializing the obligation via a mortgage loan agreement, said blockchain generated and stored on a computer server accessible via a communications network, said blockchain comprising multiple time sequential blocks, each block storing information related to the obligation;

the participant, or any other participant, transmitting to the blockchain an electronic artifact representative of a hardcopy file and location storing the hardcopy file, which includes at least one of: a promissory note, a work order, an email, a correspondence and a conversation recordation;

generating a second additional block on the blockchain;

recording the electronic artifact on the second additional block on the blockchain;

establishing a link between the electronic artifact and the hardcopy file, said electronic artifact links to the location storing the hardcopy file as a physical address of a building on the blockchain;

recording the location storing the hardcopy file as action data on the second additional block on the blockchain;

linking a loan action to action data, the loan action comprising at least one of: payments on the loan, phone calls between the borrower and a loan servicer, audits on the loan, actions necessary to protect the collateral of the loan, foreclosures, additional services offered based upon one or both of the loan and collateral, a default on a loan payment, and the action data comprising at least one of: the name of a participant requesting or performing a new loan action, a type of action, a time and date of the request, a time and date of requested performance, a deadline for complying with a request, data related to a communication session which can be by phone, video, live interaction or duration of the communication session, a reason for executing a loan action, a change to a pending obligation, a read permission for a block, an action taken in response to a request documented at a specific block, and cross-reference linking between blocks, said action data further comprising a private key that is used as a mechanism to permit access to the portion of the blockchain via the granted access rights;

recording the loan action and the action data on the second additional block based on the electronic artifact;

granting access rights to the participant or the any other participant to the second additional block storing the electronic artifact;

transmitting to the participant or the any other participant a portion of the blockchain via the granted access rights;

generating a third additional block comprising a record of a payment related to the obligation memorialized in the mortgage loan agreement, generating a fourth additional block memorializing an inspection of the collateral asset that is authenticated by the participant or the any other participant by viewing the hardcopy file of the electronic artifact at the location storing the hardcopy file, said authentication being conducted on a uniquely identified mobile smart device corresponding, to the participant or the any other participant, generating a fifth additional block memorializing an appraisal of the collateral asset, generating a sixth additional block memorializing a correspondence regarding the mortgage loan agreement;

establishing the granted access rights to each of the first additional block, the second additional block, the third additional block, the fourth additional block, the fifth additional block and the sixth additional block for the participant or the any other participant;

granting to the participant or the any other participant access to the portion of the blockchain via the granted access rights using the private key; and transmitting via the communications network, the portion of the blockchain granted access via the ranted access rights and comprising the first additional block, the second additional block, the third additional block, the fourth additional block, the fifth additional block and the sixth additional block for the participant or the any other participant.

2. The method of claim 1, wherein the action data comprises an identity of a person executing the loan action.

3. The method of claim 1, wherein the action data comprises a resulting loan balance following the loan action.

4. The method of claim 1, additionally comprising the steps of: cross-referencing a previous block of the blockchain relating to the loan action; and storing in the blockchain a date for a follow-up action.

5. The method of claim 1, wherein the method further comprises the steps of: communicating with a server configured as a portal in logical connection with the communications network, the portal comprising a memory, a processor, and a software executable on demand, said portal having full read access and write access to the blockchain as the participant; receiving new action data from a vendor participant via the communications network; and creating a new additional block on the blockchain, the new additional block comprising the new action data.

6. The method of claim 5, wherein transmissions to the portal adhere to a transmission format comprising a vendor format pertaining to a specific vendor, and a format for storing information in the blockchain comprises a recorded format in the vendor format.

7. The method of claim 1, additionally comprising the step of executing a smart contract via the communications network.

8. The method of claim 1, wherein the blockchain is accessed by the participant via the uniquely identified mobile smart device.

9. The method of claim 1, wherein information stored in the blockchain is transmitted from the uniquely identified mobile smart device.

\* \* \* \* \*